(12) United States Patent
Krishnan et al.

(10) Patent No.: US 9,848,068 B2
(45) Date of Patent: Dec. 19, 2017

(54) METHOD FOR PROVIDING A PARSER TO EXTRACT INFORMATION FROM FIELDS OF A DATA PACKET HEADER

(71) Applicant: TELEFONAKTIEBOLAGET L M ERICSSON (PUBL), Stockholm (SE)

(72) Inventors: Suresh Krishnan, Johns Creek, GA (US); Geoffrey Lefebvre, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 313 days.

(21) Appl. No.: 13/863,733

(22) Filed: Apr. 16, 2013

(65) Prior Publication Data

US 2014/0307736 A1  Oct. 16, 2014

(51) Int. Cl.
*H04L 12/741* (2013.01)
*H04L 29/06* (2006.01)

(52) U.S. Cl.
CPC ........... *H04L 69/22* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 2004/0156371 A1* | 8/2004 | Kumar | H04L 49/90 370/401 |
| 2007/0177595 A1 | 8/2007 | Yeh et al. | |
| 2007/0288479 A1* | 12/2007 | Howard | G06F 17/30887 |
| 2008/0084971 A1* | 4/2008 | Dhanakshirur | 379/88.01 |
| 2008/0279185 A1 | 11/2008 | Zhang et al. | |
| 2009/0041115 A1* | 2/2009 | Ramesh et al. | 375/240.01 |
| 2010/0085891 A1* | 4/2010 | Kind | H04L 43/026 370/253 |
| 2011/0317559 A1* | 12/2011 | Kern et al. | 370/235 |
| 2012/0110656 A1* | 5/2012 | Santos | H04L 63/0263 726/13 |
| 2012/0300615 A1* | 11/2012 | Kempf et al. | 370/216 |

(Continued)

FOREIGN PATENT DOCUMENTS

EP  1345385 A1  9/2003

OTHER PUBLICATIONS

International Search Report for PCT/IB2014/060745 dated Jul. 29, 2014; 4 pages.

*Primary Examiner* — Duc Duong
(74) *Attorney, Agent, or Firm* — Ericsson Inc.

(57) ABSTRACT

A method for providing a parser by a network node, which includes a table defining a plurality of rules and a plurality of match fields required for extraction from an incoming data packet header in order to apply each of the respective rules is described. The method comprises determining at least one occurrence in the table of a first match field that requires extraction; and determining a parser for use in accordance with the at least one determined occurrence of the first match field. Furthermore, the step of determining at least one occurrence of the first match field comprises initializing a counter associated with the first match field and incrementing the counter for each of the plurality of rules that requires extraction of the first match field. And the step of determining a parser comprises determining the parser for use in accordance with the counter. A network node for carrying this method is also described.

35 Claims, 5 Drawing Sheets

(56) References Cited

U.S. PATENT DOCUMENTS

| | | | |
|---|---|---|---|
| 2013/0058230 A1* | 3/2013 | Wvong et al. ................ | 370/252 |
| 2013/0163426 A1* | 6/2013 | Beliveau ............... | H04L 67/327 |
| | | | 370/235 |
| 2013/0170435 A1* | 7/2013 | Dinan ........................... | 370/328 |
| 2014/0269762 A1* | 9/2014 | Voit ....................... | H04L 45/52 |
| | | | 370/466 |
| 2014/0286342 A1* | 9/2014 | Xia ........................ | H04L 45/38 |
| | | | 370/392 |
| 2016/0006650 A1* | 1/2016 | Song .................. | H04L 12/6418 |
| | | | 370/329 |

* cited by examiner

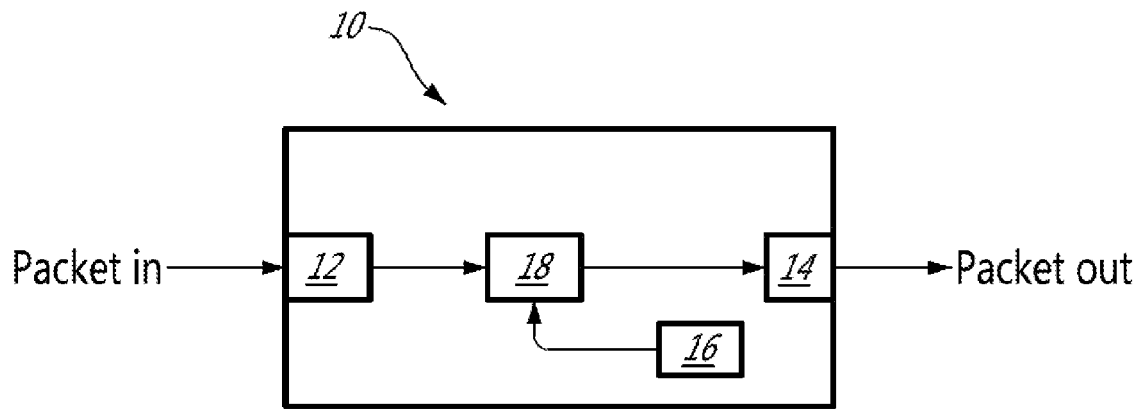

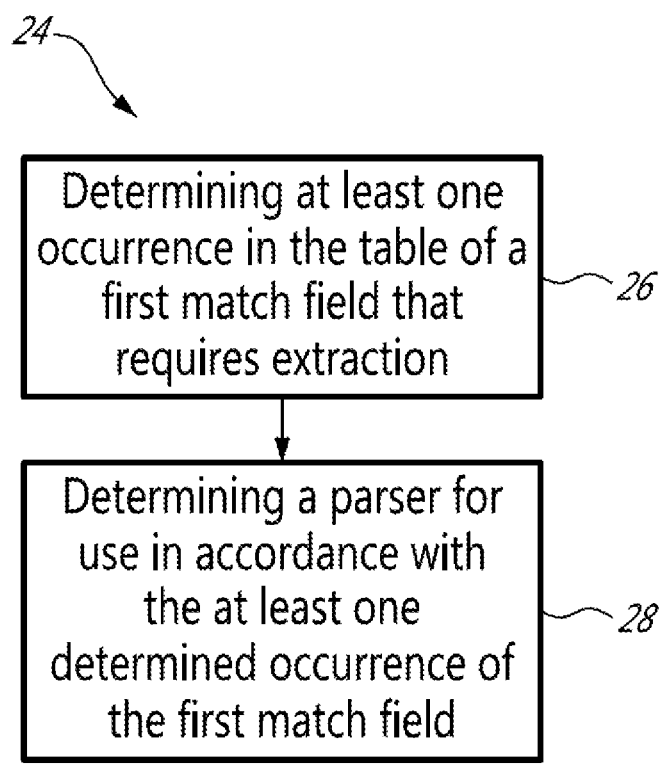

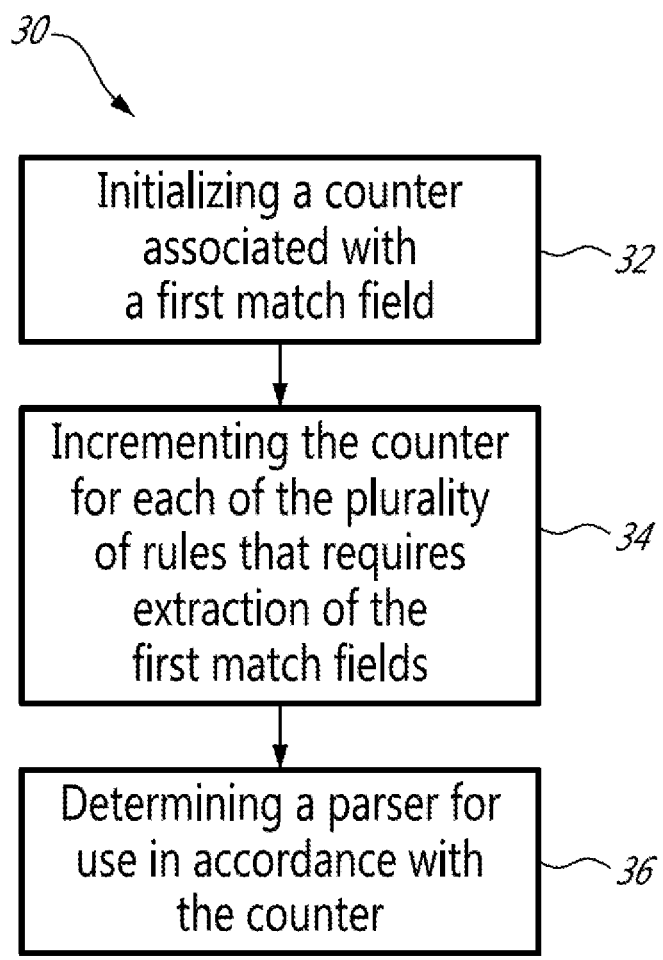

| Match field 1 | Match field 2 | ... | Match field m | ~42 |
|---|---|---|---|---|
| Counter 1 (200) | Counter 2 (0) | ... (100) | Counter m (5) | ~44 |

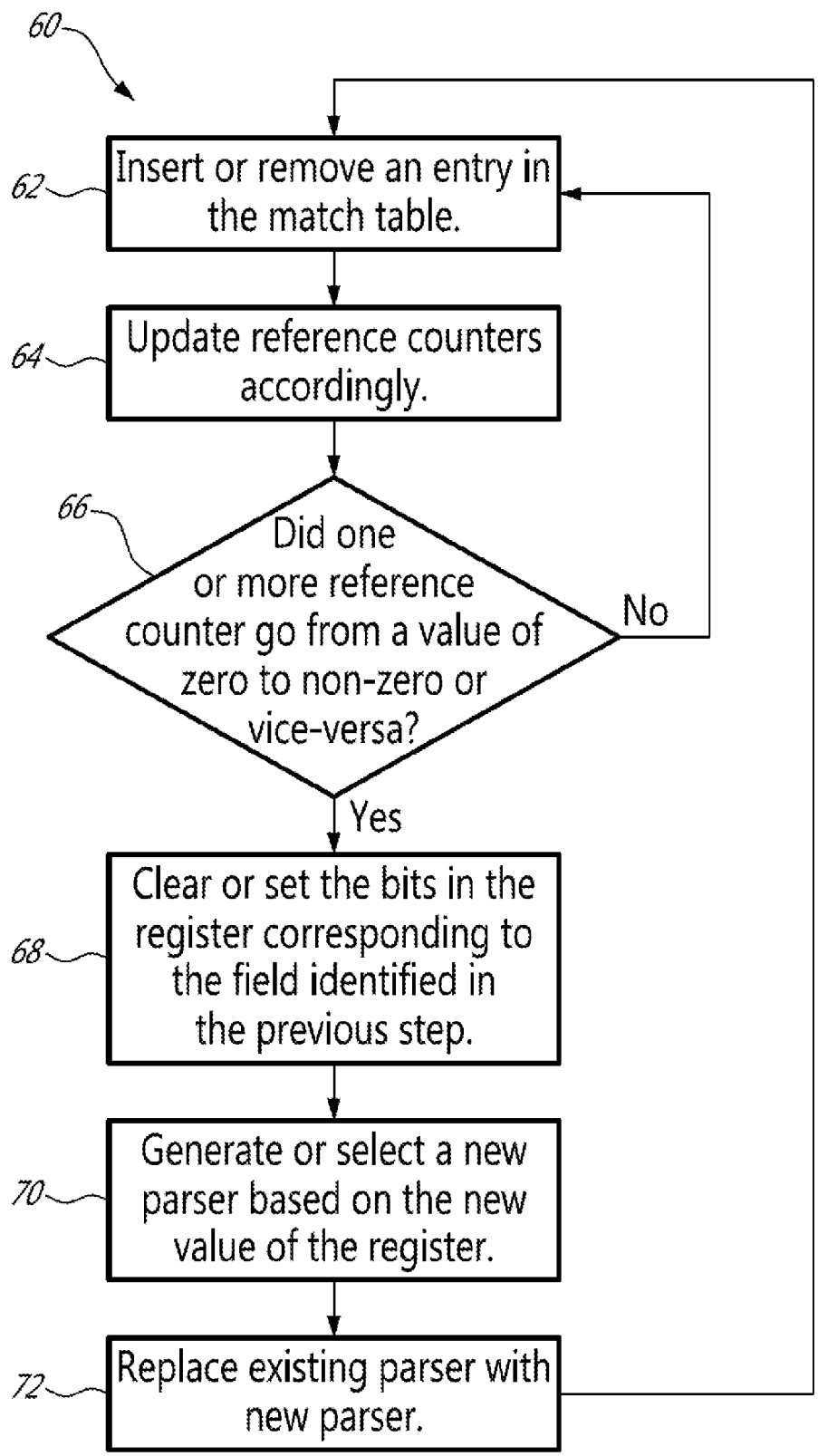

METHOD FOR PROVIDING A PARSER TO EXTRACT INFORMATION FROM FIELDS OF A DATA PACKET HEADER

TECHNICAL FIELD

The present invention generally relates to communication networks and providing a parser by a network node.

BACKGROUND

Over the past few decades, Internet has experienced an incredible growth and expansion. Technologies have changed from centralized computing to personalized computing, to mobile computing and now to intelligent services with a convergence of networks, devices and services.

As such, the amount of data packets travelling through the internet or a broadband communication network is incredibly large. Generally, data packets are composed of a header section and a payload section. The payload section is used to carry "useful information" or "actual information" that end-users, for example, want to exchange between each other. The header section is made up with a plurality of fields that are used to "describe the packet" by providing, for example, the source address of the packet, its destination address, the protocol used, the version of the protocol, a checksum for auto-correcting the packet, etc.

In order to know how to deal with each packet, for example, how to forward a packet in a communication network, network nodes, such as routers and switches, need to parse the fields of the header of each packet to extract the information that is needed by the network nodes. To do so, the network nodes often use multi-dimensional tables with associated rules, where the keys used for lookups in the multi-dimensional tables are formed from the multiple packet header fields. These tables are used in many applications such as Software Defined Networking and Access Control Lists (ACLs).

These multi-dimensional tables have two defining characteristics: they are very wide, because there are many fields in a packet header, and many of the fields are wildcarded (i.e. they match all values). For example, an OpenFlow switch has a table which consists of 15 fields spread across four layers, i.e. datalink, MultiProtocol Label Switching (MPLS), network, and transport layers. However, an Internet Protocol version 4 (IPv4) forwarding table in a router would use only one of the fields, i.e. the field comprising the destination IP address, and wildcarding all the other fields, in order to know how, i.e. where, to forward an incoming packet.

Using the example of the forwarding table, when the router receives the packet, its parser will extract information from a plurality of fields of the packet header to build a key for lookup in the table of the router. However, many of the fields in the table are wildcarded, i.e. they can match any value. Therefore, the parser or parsing code will have extracted the plurality of packet header fields for no reason, wasting precious processing resources.

Therefore, there is still a need to improve packet parsing in a communication network.

SUMMARY

More specifically, in accordance with a first aspect of the present invention, there is provided a method for providing a parser by a network node that includes a table defining a plurality of rules and a plurality of match fields required for extraction from an incoming data packet header in order to apply each of the respective rules. The method comprises determining at least one occurrence in the table of a first match field that requires extraction; and determining a parser for use in accordance with the at least one determined occurrence of the first match field.

Furthermore, the step of determining at least one occurrence of the first match field may further comprise initializing a counter associated with the first match field and incrementing the counter for each of the plurality of rules that requires extraction of the first match field. And the step of determining a parser comprises determining the parser for use in accordance with the counter.

In accordance with a second aspect of the present invention, there is provided a network node for providing a parser, the network node including a table defining a plurality of rules and a plurality of match fields required for extraction from an incoming data packet header in order to apply each of the respective rules. The network node comprises a detector for determining at least one occurrence in the table of a first match field that requires extraction; and a processor associated with the detector for determining a parser for use in accordance with the at least one determined occurrence of the first match field.

In another embodiment, the detector can be an initialized counter associated with the first match field; and wherein the processor is further associated with the counter for incrementing the counter for each of the plurality of rules that requires extraction of the first match field and for determining a parser for use in accordance with the counter.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the appended drawings:

FIG. 1 is a schematic diagram of a switch for receiving a packet and for processing the packet;

FIG. 2 is a schematic view of a multi-dimensional table used by the switch of FIG. 1;

FIG. 3 is a flow chart illustrating a method for providing a parser according to a non-restrictive illustrative embodiment of the present invention;

FIG. 4 is a flow chart illustrating a method for providing a parser according to an another embodiment of the present invention;

FIG. 7 is a flow chart illustrating a method of determining a new parser according to a non-restrictive illustrative embodiment of the present invention.

DETAILED DESCRIPTION

Figures 5, 6:
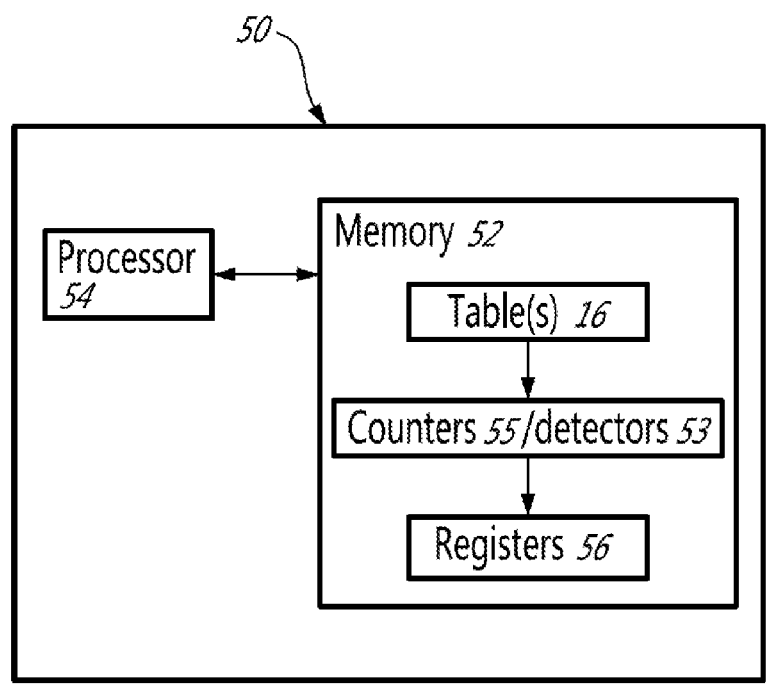
FIG. 5 illustrates a reference table, according to an embodiment of the present invention.
FIG. 6 is a schematic diagram of a network node for providing a parser according to a non-restrictive illustrative embodiment of the present invention.

In the following description, an illustrative embodiment of the present invention will be described in the context of a switch, such as an OpenFlow switch. However, embodiments of the present invention are not restricted to switches only and may be applied to other network nodes such as routers, as will be appreciated by a person skilled in the art.

Generally stated, embodiments of the present invention allow to determine an optimal parser or new parser, for extracting only information, from an incoming data packet header, that is needed according to the requirements given by tables or lookup tables in a switch or router. A lookup table has a plurality of rows for defining different rules and a plurality of columns for defining a plurality of match fields, the match fields being required for extraction from the incoming data packet header in order to apply each of the respective rules. In one embodiment, a detector is associated with each match field of the table. The plurality of detectors determines at least one occurrence of corresponding match fields, that are not wildcarded, e.g. the match fields require extraction of the corresponding information from a packet header. The new or optimal parser is then determined in accordance with the determination of the at least one occurrence of the match fields.

In another embodiment, the detector is a counter that is associated with each match field of the table and is initialized. The counter allows for counting the number of occurrences of the match field that requires extraction from the incoming data packet header. During the count operation, if a match field of the table is not wildcarded, then its corresponding counter is incremented. If the match field is wildcarded, then its corresponding counter is not incremented. Thus, depending on the count for each counter associated with a match field of the table, it is possible to determine what information from an incoming data packet header a parser needs to extract. Furthermore, it is possible to determine a particular parser to extract such information. For example, if the counter associated with a match field of the table has a count that is equal to an initial value, it means that this match field is wildcarded and thus the determined parser does not need to extract the information corresponding to that match field, from the packet header. However, if the counter associated with another match field has a count that is different than the initial value, then the determined parser will need to extract the information corresponding to that match field from the packet header As an example, the counters are initialized to the value of zero. Of course, it should be noted that the value of zero is only an example of an initial value for the counters. Other values could be used as the initial value, as will be appreciated by a person skilled in the art. Also, each of the counters could be initialized to a different initial value, respectively.

As well-known in the art, a switch or a router in a communication network allows at least for processing and forwarding data packets within the communication network, based on table lookups. When the router or switch receives a data packet, it parses the data packet to extract the information that is needed from the match fields of their tables. For example, for forwarding purposes, the parser of the switch or router will extract the destination IP address, which allows the router to know where to forward the data packet next.

As an example, FIG. 1 illustrates a schematic diagram of a switch 10. The switch 10 could be an OpenFlow switch. Alternatively, the switch 10 could be replaced by a router.

The switch 10 has a first communication interface 12, a second communication interface 14, a parser 18 and one or more multi-dimensional tables 16 for lookups, even though FIG. 1 shows only one such table. The multi-dimensional tables for lookups will be simply referred to as table 16 hereinbelow.

The first communication interface 12 is used to receive an incoming data packet. The second communication interface 14 is used to transmit the data packet to the communication network, once the data packet has been processed by the switch 10, for example, through parsing by the parser 18 and application of the rules provided by one or more tables 16 to the data packet.

Of course, the switch 10 may comprise a plurality of other elements (not shown in the figure), such as processors and memories for performing the tasks and procedures of the present invention and the usual tasks and procedures known in the art.

Now with reference to FIG. 2, a table 16 will be described in more detail.

The table 16 comprises a plurality of rows 20 and columns 22. Each row 20 of the table 16 corresponds to a rule to be applied to a data packet. For each rule, a plurality of match fields, corresponding to the columns 22, are defined. The match fields indicate the information that requires extraction from the fields of a data packet header. For example, a row 20 of the table 16 could be used to determine the forwarding rule for a data packet (e.g. Rule 1). In this case, only the match field corresponding to the destination IP address needs to be matched, i.e. the corresponding information needs to be extracted from the data packet header. The rest of the match fields can be wildcarded.

It should be noted that the table 16 may comprise additional match fields corresponding to information that is not extracted from a packet header but that comes from the context. The context can be anything that is associated with the packet but not contained in the packet, for example, the interface on which the packet was received on, the time of the day when the packet was received, etc. The match fields that correspond to fields of a packet header form a key for lookup in the table 16. The match fields corresponding to information coming from the context form a result. However, for the present disclosure, only the match fields that correspond to fields of a packet header will be considered, since a parser's task is to extract information from a data packet header.

For example, in OpenFlow 1.1, a lookup table can have up to 15 match fields, such as ingress port, metadata, Ethernet source address, Ethernet destination address, Ethernet type, Virtual Local Area Network IDentity (VLAN ID), VLAN priority, MPLS label, MPLS traffic class, IPv4 (or IPv6) source address, IPv4 (or IPv6) destination address, IPv4 protocol/Address Resolution Protocol (ARP) opcode, IPV4 ToS bits, TCP/UDP/SCTP source port, TCP/UDP/SCTP destination port/ICMP code.

In order to apply any of the rules of the table 16, to an incoming data packet, a conventional switch would parse all the fields of the packet header corresponding to the match fields of the table 16. In the case of the OpenFlow table, the switch would parse the data packet header to extract the 15 match fields of the table 16. However, in the example of the forwarding rule, besides the match field corresponding to the destination IP destination address, all of the rest of the match fields are wildcarded. Therefore, by extracting the 15 match fields, the switch is wasting precious processing resources.

With reference to FIG. 3, a method 24 for providing a parser by a network node, according to an embodiment of the present invention will be described in more detail. The method allows to reduce the amount of processing resources wasted on parsing unnecessary fields. The network node can be a router or a switch and comprises a table, such as the table 16, which has a plurality of rules and a plurality of match fields.

Method 24 starts with step 26 in which a detector, for example, determines at least one occurrence in the table 16 of a first match field that requires extraction of corresponding information from an incoming data packet header.

In step 28, a parser is determined for use in accordance with the at least one determined occurrence of the first match field.

According to this method, when a rule is added to the table 16 or removed from the table 16, the detector is updated, i.e. the detector reads the table 16 again to determine at least one occurrence of a first match field.

Alternatively, according to another embodiment of the present invention, the detector for determining at least one occurrence of a first match field can be replaced by a counter for counting the number of occurrences of the first match field.

More specifically, method 30 of FIG. 4 illustrates a method of providing a parser by a network node using counters.

Method 30 starts with step 32 in which a counter associated with a first match field is initialized. For example, the counter can be initialized to the value of zero.

In step 34, the counter is incremented for each of the plurality of rules that requires extraction of the first match field.

In step 36, a parser is determined for use in accordance with the counter.

It should be noted that for each of the plurality of match fields of the table 16, a respective counter is associated therewith and initialized. Each of the plurality of counters is incremented for each of the plurality of rules that requires extraction of the corresponding match field. A parser is determined for use in accordance with the plurality of counters.

Method 30 implies that when a match field is wildcarded, meaning that any value can be used or that field is not relevant to the application of the given rule, then its corresponding counter is not incremented.

Whenever a new rule is added to the table 16, the plurality of counters associated with the plurality of match fields is updated. A counter associated with a match field is incremented if the match field for the new rule requires extraction of the match field from the data packet header. When a rule is removed from the table 16, the counters associated with the match fields that require extraction of the match fields from the data packet header are decremented.

Once the count operation of the plurality of counters is finished, a reference table can be built using the plurality of counters. The reference table helps with the determination of a parser to use for extracting the required match fields from the data packet header.

FIG. 5 illustrates such an exemplary reference table 40. The reference table 40 comprises a first row 42 with the plurality of match fields corresponding to those in the table 16. The reference table 40 also comprises a second row 44 which has the plurality of counters associated with the plurality of match fields.

The size of each field of the exemplary reference table 40 is log 2M bits, where M is the maximum number of entries that need to be stored in the table 16. The reference table 40 is expected to be scalable since the size of the fields scales logarithmically with the number of entries in table 16. For example, for a table 16 with 4 billion (2^32) entries, the field size would only need to be 32 bits (4 bytes). If there are 32 fields to be matched in the packet, the table size would be 128 (32*4) bytes. In the general case, the size of the table would be N*RoundUpwards(log 2(M)/8) bytes, where N is the number of match fields.

By looking at the reference table 40, it is easy to know how many match fields of the table 16 require a non-wildcarded match, i.e. an extraction of the match fields from the data packet header. The reference table 40 also shows how many match fields of the match table 16 are wildcarded, i.e. any value can be used. By using this table, it is possible to determine a parser for extracting only the information corresponding to the match fields that require such extraction. For example, for all the counters whose count is different than the initial value, the parser will extract their corresponding match fields from the data packet header. In contrast, the parser will skip the match fields whose count remains at the initial value, i.e. the parser will not extract any information corresponding to these match fields. Therefore, depending on the content of the counters in the reference table 40, a specialized or optimal parser can be determined. As an example, FIG. 5 shows that Counter 1 associated with Match field 1 has a count of 200. Counter 2 associated with Match field 2 has a count of zero (0). And all the other counters until Counter m associated with their corresponding Match fields have a count different than zero. Assuming that the counters have been initialized to the value of zero, the determined parser would parse an incoming data packet to extract information corresponding to Match fields 1, 3, . . . , m. However, the determined parser would skip Match field 2, i.e. will not extract information from the incoming data packet corresponding to Match field 2, since its associated counter is at zero (the initial value).

It should be understood that other data structures could hold or represent the counters and their associated match fields. Embodiments of the present invention are not restricted to a table. Other representations, such as lists, trees, etc. could be used as well, as will be appreciated by a person skilled in the art.

Once a parser is determined based on the content of the counters of the reference table 40, the parser can be selected or generated. Also, a new parser is determined whenever the count of a counter associated with a particular match field changes states from the initial value to another value, different than the initial value, and/or vice-versa.

Now, turning to FIG. 6, a network node 50 for providing a parser will be described, according to an embodiment of the present invention.

The network node 50 could be the switch 10 or a router, for example.

The network node 50 has a memory 52 which includes a table 16, a plurality of counters 55 and/or detectors 53 associated with the plurality of match fields of the table 16 and one or more registers of bits 56. A processor 54 is associated with the memory 52, the plurality of the counters 55 and detectors 53 and the registers 56.

The network node 50 may comprise other elements (not shown) such as additional processors and memories and a communication interface, for performing the tasks and procedures of the present invention and the usual tasks and procedures well-known in the art. The network node 50 may also have more than one table 16. For each of the tables 16, a plurality of counters 55 and/or detectors 53 is associated with the plurality of match fields.

The processor 54 is associated with the plurality of detectors 53 for determining a parser for use in accordance with at least one occurrence of the plurality of match fields, determined by the detectors 53.

The processor 54 can also be used to initialize one or the plurality of counters 55. The processor 54 is also used to increment each of the plurality of counters 55 for each of the plurality of rules of table 16 that requires extraction of each of the respective match fields. After the count operation, the processor 54 can build the reference table 40, containing the plurality of match fields and their associated counters. Also, the processor 54 determines a parser for use in accordance with the plurality of counters 55.

Furthermore, the processor 54 updates the plurality of counters 55 when a new rule is inserted in the table 16 or when a rule is removed from the table 16. For example, in response to the addition of the new rule, the processor 54 increments each of the plurality of counters 55 associated with the match fields that require extraction based on the new rule. In case of the removal of the rule, the processor 54 decrements each of the plurality of counters 55 associated with the match fields that require extraction based on the removed rule. The processor 54 also determines a new parser for use based on the plurality of updated counters 55.

Embodiments of the present invention propose two approaches for determining the parser in accordance with the plurality of counters 55 by the processor 54. The first approach uses a register, such as 56, for generating the determined parser. The second approach uses a similar register, a table, and a set of predefined parsers for selecting the determined parser from the set of predefined parsers.

More specifically, in the first approach, the register 56 contains a string of bits, where each bit corresponds to a match field of the table 16 or the reference table 40. For each bit of a corresponding match field whose associated counter has a count different than an initial value, the processor 54 sets the bit.

Also, the register of bits 56 is updated whenever one or more counters from the plurality of counters change states, e.g., going from an initial value to another value, different than the initial value. In this case, the register 56 is updated by setting the bits corresponding to the match fields which are associated with the counters. For example, the processor 54 performs the update by incrementing the appropriate bits.

If a counter changes states going from a value that is different than an initial value to the initial value, the register 56 is also updated by clearing the bit corresponding to the match field which is associated with the counter. Again, the processor 54 can perform this update by clearing the appropriate bit.

The content of the register 56 is then used as an input to the generation of the determined parser, i.e. the processor 54 generates a parser corresponding to the content of the register 56.

The size of the register 56 is N bits where N is the number of match fields. As previously mentioned, N is expected to be less or equal to 32.

In the second approach, the processor 54 uses a register of bits 56, a selector table and a set of predefined parsers (not shown in FIG. 5). In this approach, instead of being used as a direct input to the generation of the parser, the content of the register of bits 56 is used as a key in the selector table.

Each entry in the selector table comprises a key-value pair. The key is one of the possible configuration of bit setting of the register 56, and the value is a pointer to the corresponding parser from the set of predefined parsers. Therefore, the content of the register 56 allows for finding the desired parser from the set of predefined parsers.

In theory, the selector table could be very large since for N match fields, there could exists $2^N$ different keys. In practice, this table will be much smaller since many of the packet header fields are mutually exclusive (e.g. IPv4 vs. IPv6 vs. ARP or Internet Control Message Protocol (ICMP) vs. TCP vs. User Datagram Protocol (UDP)) resulting in most of the combinations/possibilities being absent from the selector table.

The set of predefined parsers is given by all of the possibilities of configuration of the bit setting of the register 56. It is also possible to avoid using different parsers for each possible value of the register 56. For example, a parser can be parametrized by passing down the register value as a parameter, thus reducing the total number of distinct parsers required. There is a tradeoff between parser performance and the amount of memory required to store the parsers since as the number of dynamic checks to test if a field should be parsed or not increases parsing time but reduces the number of parsers needed.

It is up to the network operator or administrator to decide which approach to implement, whether to generate a parser or to select a parser from a set of predefined parsers.

Now turning to FIG. 7, a method for determining a new parser will be described, according to an embodiment of the present invention.

The method 60 starts with step 62 when a rule is either inserted or removed from the table 16.

In step 64, the counters 55 associated with the plurality of match fields of the table 16 are updated accordingly, as explained above. For example, if a new rule is inserted, a counter 55 associated with a match field is incremented if the match field for the new rule requires extraction of the match field from the data packet header. When a rule is removed from the table 16, the counters 55 associated with the match fields that require extraction of the match fields from the data packet header are decremented.

In step 66, a check is performed to determine whether one or more counters 55 have changed states, for example, from the initial value to a value different than the initial value, or vice-versa.

If it is determined that one or more counters have changed states, in step 68, a new parser is determined and the bits in the register 56 are set or cleared according to the change of the states.

In step 70, the new parser is provided, whether it is generated or selected, based on the new values/content of the register 56.

In step 72, the existing parser is replaced by the new parser. The method 60 starts all over again with step 62, when a rule is inserted or removed from the table 16.

If in step 66, the check determined that no counters 55 have changed states, then the method goes back to step 62 where a rule is either inserted or removed from the table 16.

As mentioned before, a new parser is selected or generated whenever a counter 55 changes states. This happens at a frequency much lower than the update frequency of the tables 16.

Advantages of the embodiments of the present invention include reducing the waste of processor cycles on parsing packet header fields that do not affect the outcome of a table lookup. By so doing, the forwarding performance can be increased multiple times since the throughput is directly related (inversely proportional) to the number of cycles required to process the packet.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for providing a parser by a network node that includes a table defining a plurality of rules and a plurality of match fields required for extraction from an incoming data packet header in order to apply each of the respective rules, the method comprising:
    determining at least one occurrence in the table of a first match field that requires extraction; and
    determining a parser for use in accordance with the at least one determined occurrence of the first match field, the first match field corresponding to a field in the incoming data packet header, wherein the parser, when in use, is configured to extract only match fields for which an occurrence is determined.

2. The method of claim 1, wherein determining at least one occurrence of a first match field comprises:
    initializing a counter associated with the first match field; and
    incrementing the counter for each of the plurality of rules that requires extraction of the first match field.

3. The method of claim 2, wherein determining a parser for use in accordance with the at least one determined occurrence of the first match field comprises determining the parser for use in accordance with the counter.

4. The method of claim 3, further comprising:
    initializing a plurality of counters, each counter associated with a respective one of the plurality of match fields;
    incrementing each of the plurality of counters for each of the plurality of rules that requires extraction of each of the respective match fields; and
    determining the parser for use in accordance with the plurality of counters.

5. The method of claim 4, further comprising building a reference table associated with the table, the reference table having a first row corresponding to the plurality of match fields and a second row corresponding to the plurality of counters.

6. The method of claim 4, wherein the determined parser only extracts, from the incoming data packet header, match fields whose associated counters have a count different than an initial value.

7. The method of claim 4, wherein determining the parser comprises generating the parser.

8. The method of claim 7, wherein generating the parser comprises:
    using a register of bits, each bit corresponding to a match field;
    setting each of the bits for a corresponding match field whose associated counter has a count different than an initial value; and
    generating the parser according to the set bits of the register.

9. The method of claim 4, wherein determining the parser comprises selecting the parser among a set of predefined parsers.

10. The method of claim 9, wherein selecting the parser among a set of predefined parsers comprises:
    using a register of bits, each bit corresponding to a match field;
    setting each of the bits for a corresponding match field whose associated counter has a count different than an initial value; and
    selecting the parser corresponding to the set bits among the set of predefined parsers, wherein the set of predefined parser is given by a plurality of possibilities of configuration of bit setting of the register of bits.

11. The method of claim 10, wherein selecting the parser among the set of predefined parsers comprises using a table, which includes the plurality of possibilities of configuration of bit setting of the register of bits and a key to point to the configuration of bit setting corresponding to the selected parser.

12. The method of claim 4, further comprising updating the plurality of counters in response to one of an addition of a new rule to the table and a removal of a rule from the table.

13. The method of claim 12, wherein updating the plurality of counters in response to an addition of the new rule comprises incrementing each of the plurality of counters associated with the match fields that require extraction based on the new rule.

14. The method of claim 12, wherein updating the plurality of counters in response to a removal of the rule comprises decrementing each of the plurality of counters associated with the match fields that require extraction based on the removed rule.

15. The method of claim 12, further comprising determining a new parser based on the plurality of updated counters.

16. The method of claim 15, wherein determining a new parser comprises determining a change in states of at least one counter.

17. The method of claim 16, wherein determining a change in states comprises one of a count of the at least one counter going from an initial value to a value different than the initial value and a count of the at least one counter going from a value different than an initial value to the initial value.

18. The method of claim 16, wherein determining a new parser comprises:
    using a register of bits, each bit corresponding to a match field;

updating the register of bits by performing one of setting and clearing a bit for a corresponding match field whose associated count has changed in states; and determining the new parser in accordance with the updated register of bits.

19. The method of claim 1, further comprising, responsive to the determination of the at least one occurrence of the first match field, using the determined parser to read the first match field from the incoming data packet.

20. A network node for providing a parser, the network node including a table defining a plurality of rules and a plurality of match fields required for extraction from an incoming data packet header in order to apply each of the respective rules, the network node comprising:
   a detector for determining at least one occurrence in the table of a first match field that requires extraction; and
   a processor associated with the detector for determining a parser for use in accordance with the at least one determined occurrence of the first match field, the first match field corresponding to a field in the incoming data packet header, wherein the parser, when in use, is configured to extract only match fields for which an occurrence is determined.

21. The network node of claim 20, wherein the detector comprises an initialized counter associated with the first match field; and wherein the processor is further associated with the counter for incrementing the counter for each of the plurality of rules that requires extraction of the first match field and for determining a parser for use in accordance with the counter.

22. The network node of claim 21, wherein the detector further comprises a plurality of initialized counters, each counter associated with a respective one of the plurality of match fields, wherein the first processor is further associated with the plurality of counters for incrementing each of the plurality of counters for each of the plurality of rules that requires extraction of each of the respective match fields, and for determining the parser for use in accordance with the plurality of counters.

23. The network node of claim 22, wherein the processor further builds a reference table associated with the table, the reference table having a first row corresponding to the plurality of match fields and a second row corresponding to the plurality of counters.

24. The network node of claim 23, further comprising:
   a register of bits, each bit corresponding to a match field; and
   a set of predefined parsers, corresponding to a plurality of possibilities of configuration of bit setting of the register of bits;
   wherein the processor is further configured to set each of the bits for a corresponding match field whose associated counter has a count different than an initial value and to select the parser for use corresponding to the set bits among the set of predefined parsers.

25. The network node of claim 24, wherein the processor selects the parser for use among the set of predefined parsers using a table and a key to point to the parser corresponding to the selected parser.

26. The network node of claim 23, wherein the processor updates the plurality of counters in response to one of an addition of a new rule to the table and a removal of a rule from the table.

27. The network node of claim 26, wherein the processor updates the plurality of counters in response to an addition of the new rule by incrementing each of the plurality of counters associated with the match fields that require extraction based on the new rule.

28. The network node of claim 26, wherein the processor updates the plurality of counters in response to a removal of the rule by decrementing each of the plurality of counters associated with the match fields that require extraction based on the removed rule.

29. The network node of claim 26, wherein the processor determines a new parser based on the plurality of updated counters.

30. The network node of claim 29, wherein the processor further determines a change in states of at least one counter.

31. The network node of claim 30, wherein the processor determines a change in states by determining one of a count of the at least one counter going from an initial value to a value different than the initial value and a count of the at least one counter going from a value different than an initial value to the initial value.

32. The network node of claim 31, wherein the processor further updates a register of bits, each bit corresponding to a match field, by performing one of setting and clearing a bit for a corresponding match field whose associated count has changed in states and determines the new parser in accordance with the updated register of bits.

33. The network node of claim 21, wherein the determined parser only extracts, from the incoming data packet header, match fields whose associated counters have a count different than an initial value.

34. The network node of claim 23, further comprising a register of bits, each bit corresponding to a match field and wherein the processor is further configured to set each of the bits for a corresponding match field whose associated counter has a count different than an initial value and to generate the parser for use in accordance with the set bits of the register.

35. A network node for providing a parser, the network node including a table defining a plurality of rules and a plurality of match fields required for extraction from an incoming data packet header in order to apply each of the respective rules, the network node comprising:
   a communication interface;
   a memory; and
   a processor, operatively connected to the communication interface and the memory, which contains instructions that, when executed, cause the processor to determine at least one occurrence in the table of a first match field that requires extraction; and determine a parser for use in accordance with the at least one determined occurrence of the first match field, the first match field corresponding to a field in the incoming data packet header, wherein the parser, when in use, is configured to extract only match fields for which an occurrence is determined.

* * * * *